(12) United States Patent
Sullivan et al.

(10) Patent No.: US 7,181,172 B2
(45) Date of Patent: Feb. 20, 2007

(54) METHODS AND APPARATUSES FOR AN INTEGRATED WIRELESS DEVICE

(75) Inventors: Jon Sullivan, Lincoln, NE (US); Tony Vejraska, Lincoln, NE (US); Steve Bowles, Lincoln, NE (US)

(73) Assignee: Centurion Wireless Technologies, Inc., Lincoln, NE (US)

( * ) Notice: Subject to any disclaimer, the term of this patent is extended or adjusted under 35 U.S.C. 154(b) by 0 days.

(21) Appl. No.: 10/247,648

(22) Filed: Sep. 19, 2002

(65) Prior Publication Data

US 2004/0203488 A1    Oct. 14, 2004

(51) Int. Cl.
*H04B 1/38* (2006.01)
(52) U.S. Cl. ............... 455/90.3; 455/575.1; 455/575.5; 455/575.8; 455/347

(58) Field of Classification Search ................ 455/347, 455/90.3, 575.1, 575.2, 575.3, 575.4–575.8
See application file for complete search history.

(56) References Cited

U.S. PATENT DOCUMENTS

| 5,150,282 | A  | * | 9/1992 | Tomura et al. ............. 361/818 |
| 5,933,330 | A  | * | 8/1999 | Beutler et al. ............. 361/814 |
| 6,097,339 | A  | * | 8/2000 | Filipovic et al. ............ 343/702 |
| 6,101,372 | A  | * | 8/2000 | Kubo ......................... 455/558 |
| 6,359,787 | B1 | * | 3/2002 | Peltolehto et al. .......... 361/752 |
| 6,463,263 | B1 | * | 10/2002 | Feilner et al. ............. 455/90.1 |
| 6,480,397 | B1 | * | 11/2002 | Hsu et al. ................... 361/814 |
| 6,546,265 | B1 | * | 4/2003 | Okuda ..................... 455/575.1 |
| 6,662,028 | B1 | * | 12/2003 | Hayes et al. ............. 455/575.7 |
| 2002/0022459 | A1 | * | 2/2002 | Kobayashi ................... 455/90 |

* cited by examiner

*Primary Examiner*—Marceau Milord
(74) *Attorney, Agent, or Firm*—Holland & Hart

(57) ABSTRACT

The present invention provides wireless devices where component parts are formed directly to the housing for the wireless device.

27 Claims, 8 Drawing Sheets

METHODS AND APPARATUSES FOR AN INTEGRATED WIRELESS DEVICE

FIELD OF THE INVENTION

The present invention relates to wireless devices and, more particularly, methods and apparatuses for developing an integrated wireless device to lower component part count internal to the device, the device size, the device weight, and the device manufacturing cost; and increase the device reliability and improve overall performance

BACKGROUND OF THE INVENTION

Wireless devices, such as PDAs, cellular phones, etc. contain many internal parts. These parts require specifications and designs to ensure the wireless device functions. Also, because of the small, often-handheld nature, of wireless devices, the manufacturing tolerances for the parts are controlled closely. For convenience, this application uses the example of cellular phones generically for wireless devices Conventionally, a cellular phone handset manufacture designs specifications and sizes for the parts making up the cellular phone, which typically include battery packs, antennas, ringer/vibrators, printed circuit boards, keyboard circuits, etc. The manufacture receives (or separately produces) the parts and fits them into a part housing consisting of two or three plastic injection molded or die cast pieces that fit over, encase, or "clam shell" over the internal components. The pieces, with their housing, are put in the cellular phone handset Using the above assembly method, conventional handset manufacturers expend significant resources engineering parts, identifying part manufacturers that can develop parts within narrow tolerances, and un-package and inspect each part received from a supplier. The inspection includes dimensional as well as functional inspection.

For example, FIGS. 1, 2 and 3 show a conventional antenna construct 100 for a cellular telephone in various stages of development. In this example, antenna construct 100 is manufactured using a conventional two-stage molding and selective plating manufacturing technique. One of skill in the art would recognize other and equivalent manufacturing techniques could be used, such as a metal stamping, laser etch or embossing technique. FIG. 1 shows base 102 for antenna construct 100. FIG. 1 shows base 102 having been molded with mounting anchors 108. A first injection mold is injected with a first, typically non-platable plastic, to make base plastic 102. FIG. 2 shows base plastic 102 with a platable plastic 104 molded as a second shot of plastic on base 102. A second shot of plastic, typically platable plastic, is injected into a mold during the injection molding process so that platable plastic 104 is selectively molded onto base 102. FIG. 3 shows a metal plating 106 plated onto platable plastic 104 (not shown in FIG. 3). Because base 102 is a non-platable plastic, metal-plating 106 only attaches to platable plastic 104. Thus, selectively molding platable plastic 104 on base plastic 102 allows for selectively placing metal-plating 106 to make antenna construct 100.

Once the antenna construct 100 is manufactured, it needs to be fitted into, for example, a cellular phone Antenna construct 100 is mounted to the cellular phone using a conventional coupling, such as, for example, a friction fitting, a snap lock fitting, a screw, or the like. In this case, for example, snap studs may be molded into the cellular phone housing (not shown). Mounting anchors 108 of antenna 100 would be aligned with the snap studs and fitted into the housing.

As can be seen, antenna construct 100 comprises several parts (base plastic 102, platable plastic 104, and plating 106) as well as mounting parts, such as mounting anchors 108, all of which take up space in a small cellular phone. Thus, it would be desirous to design a wireless device manufacturing process and a wireless device that would address the above mentioned and other problems in manufacturing wireless devices

SUMMARY OF THE INVENTION

To attain the advantages of and in accordance with the purpose of the present invention, handsets with a molded panel are provided. The molded panel defines, in part, an internal space that has a molded section integrated in the panel. The molded section is selectively plated, such that the molded section is a functional part of the device.

The present invention further provides methods for designing handsets for devices. The methods include designing a housing for a wireless device having at least one internal molded section. Forming the housing such that the at least one internal molded section is integral to the housing, and plating the at least one internal molded section of the housing The foregoing and other features, utilities and advantages of the invention will be apparent from the following more particular description of a preferred embodiment of the invention as illustrated in the accompanying drawings.

BRIEF DESCRIPTION OF THE DRAWING

The above and other objects and advantages of the present invention will be apparent upon consideration of the following detailed description, taken in conjunction with the accompanying drawings, in which like reference characters refer to like parts throughout, and in which.

DETAILED DESCRIPTION

Figure 4:
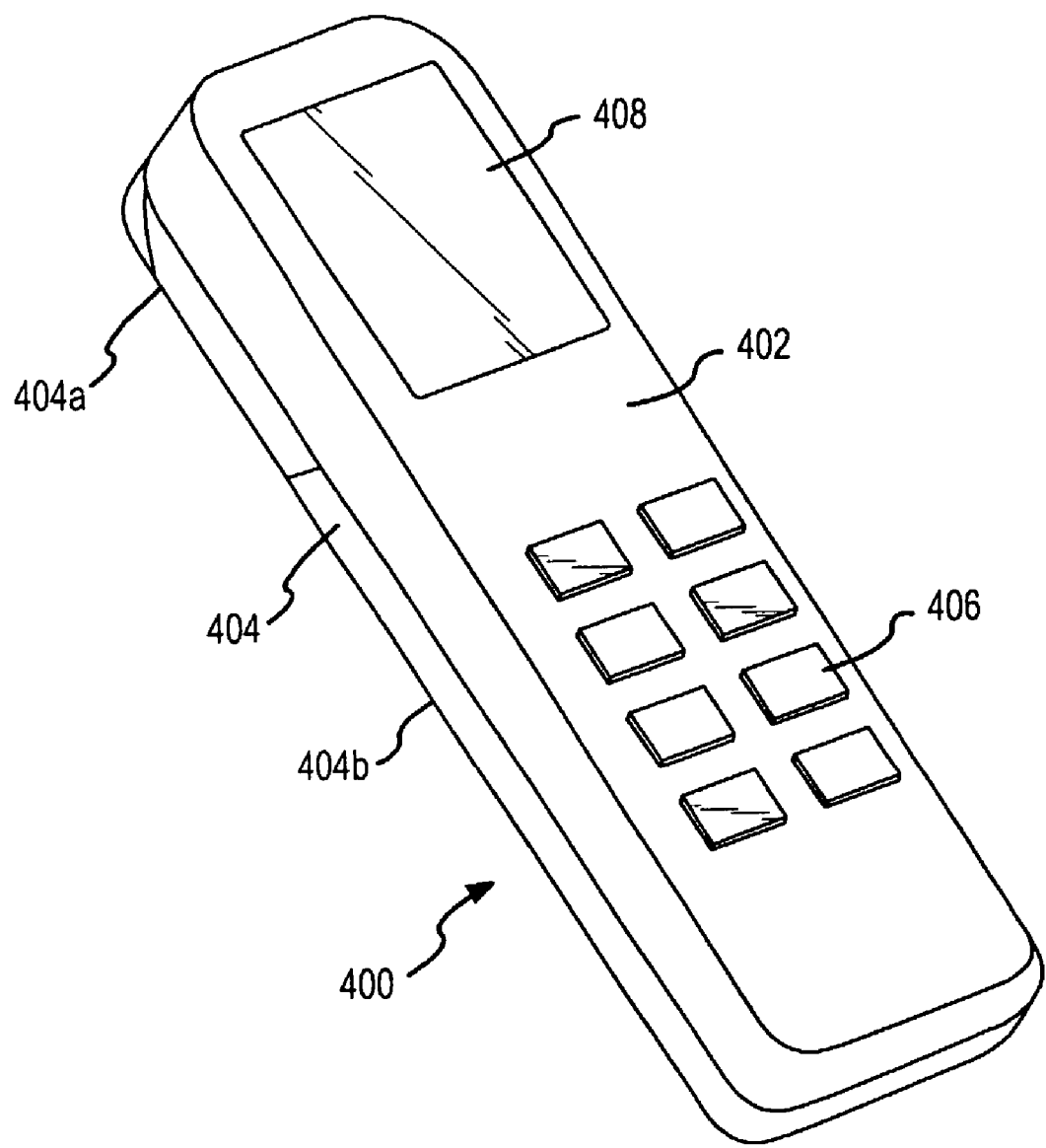
FIG. 4 is a perspective view of a cellular telephone illustrative of a wireless device consistent with the present invention.

The present invention will be described with reference to FIGS. 4–10. FIG. 4 shows a perspective view of a cellular telephone 400. Cellular telephone 400 is a representative wireless device and is illustrative of the present invention. One of ordinary skill in the art would recognize on reading the below disclosure that other types of wireless devices could benefit from the present invention including, without limitation, electronic games, personal digital assistants (PDA), wireless enabled computers, handheld radios, portable televisions, etc.

Cellular telephone 400 includes a front panel 402 and a back panel 404 Front panel 402 has at least one key 406 and at least one display 408. Keys 406 generally include, power on and off keys, alphanumeric keys (or separate alphabetic and numeric keys), a transmit key, and the like. Keys 406 and display 408, however, are representative of features that conventionally exist on the front panel of wireless devices and other features could augment or replace keys 406 and display 408, such as a mouse pad or button, a touch screen, etc. As shown, most wireless devices have housing that comprises two molded pieces of plastic; however, cellular phone 400 could have more than two external housing parts. For example, back panel 404 could be two separate panels 404a and 404b where panel 404a housed, for example, an antenna (not shown in FIG. 4) and where panel 404b housed, for example, a battery (also not shown in FIG. 4).

Figure 5:
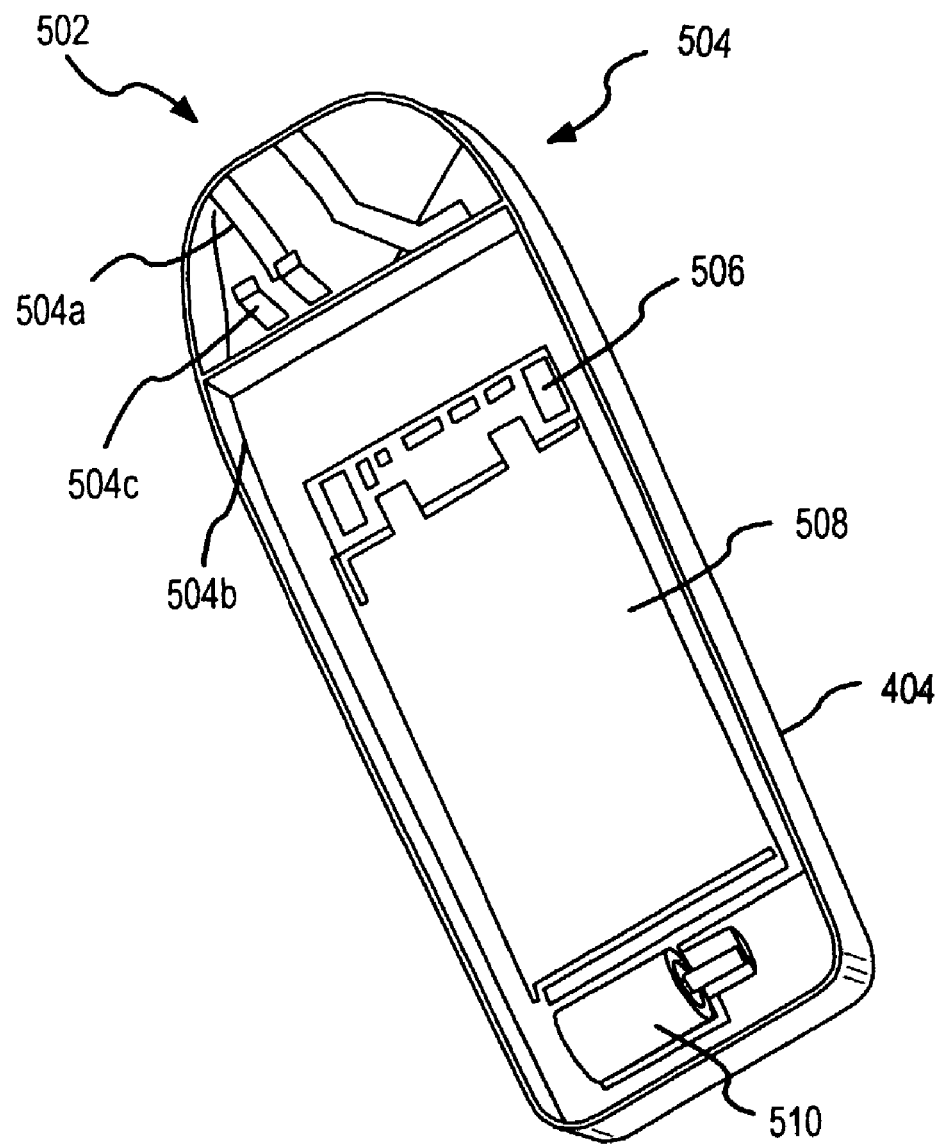
FIG. 5 is a perspective view of the back panel of the cellular telephone of FIG. 4.

FIG. 5 shows a perspective view of an internal space 502 defined, in part, by back panel 404. In this case, back panel 404 is shown as a single part for convenience. As shown, internal space 502 contains molded sections for at least one of an antenna 504, a charging circuit 506, a battery pack 508, a call alert vibrator 510, or the like. In this case, back panel cavity 502 actually contains a planer inverted F antenna 504a (with contacts 504c) and a bluetooth antenna 504b. One of ordinary skill in the art would recognize that different, more, fewer, or other parts are possible, such as GPS antennas, keyboard circuitry (such as conventional keyboards, cellular phone push buttons, or the like) the printed circuit board and its associated circuitry (which may include the keyboard circuitry, display circuitry, and other circuitry necessary for operation of the device), any part of the device that can be constructed using metalized plastic, or the like.

Figure 6:
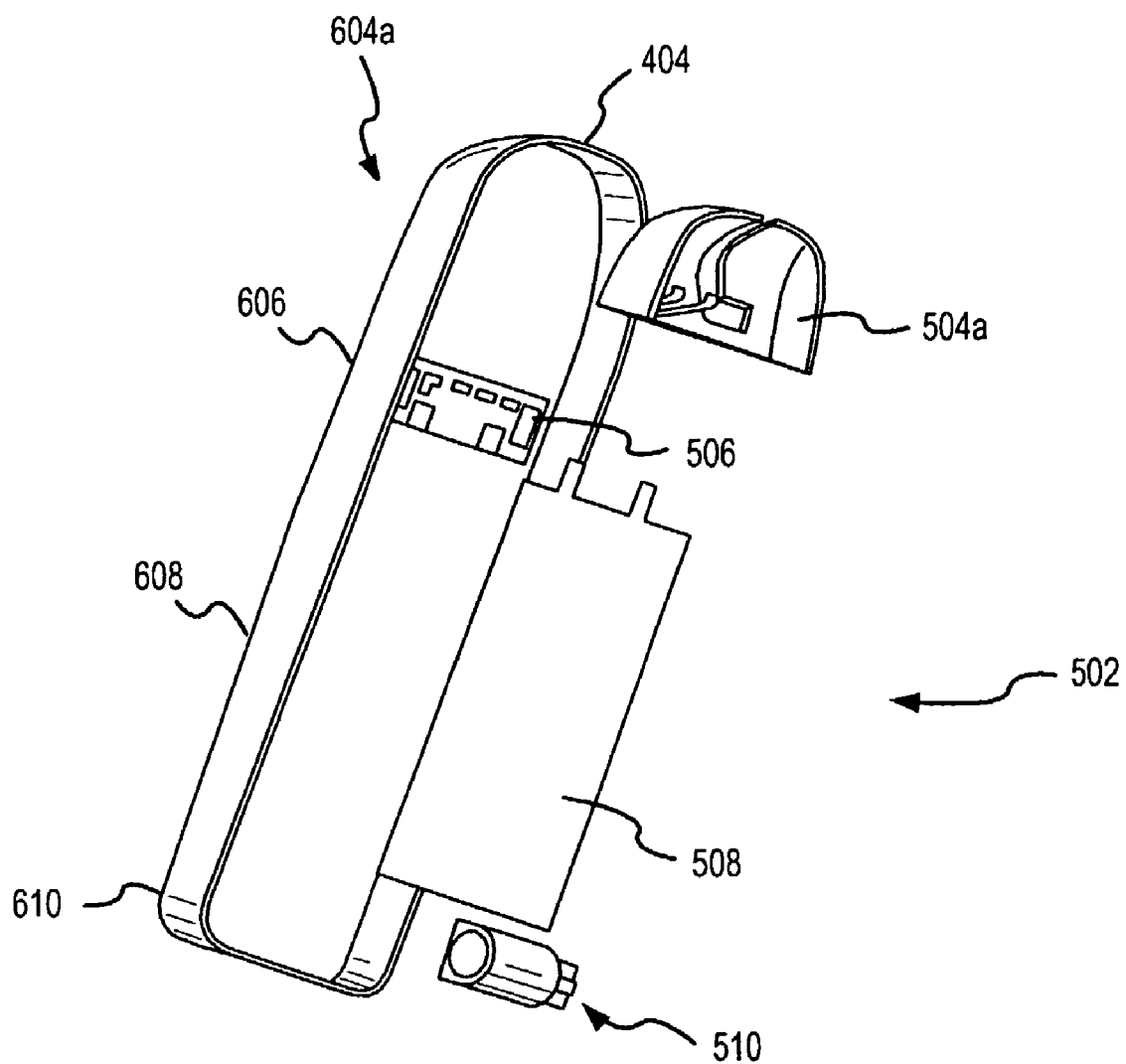
FIG. 6 is an exploded view of FIG. 5.

FIG. 6 shows an exploded view of the internal space 502 defined, in part, by back panel 404. As shown, antenna 504a is molded as a part of a corresponding molded antenna cavity section 604a, charging circuit 506 is molded directly to the back panel in a corresponding molded charger section 606, battery pack 508 snaps into molded battery section 608, and call alert vibrator 510 fits into a corresponding molded cavity section 610. While not specifically shown, one of ordinary skill in the art would now recognize that other parts could be molded and selectively plated (using the two shot molding, metal stamping, laser etch, embossing or the like), such as, for example, circuitry such as the electrical supply for the call vibrator, antenna RF transmission lines, detection circuitry for the keyboard could be molded into the panel then selectively plated. Thus, unlike conventional devices, where the internal parts are separately housed and fitted into the device using a coupling, such as a using snap studs and mounting anchors 108 (as described above) or the like, the present invention molds the base and contact plating directly into the back panel. While a possible manufacturing process for internal space 502 will be explained in conjunction with FIG. 7, below, it should be noted that while shown exploded, antenna 504a is molded into molded cavity section 604a.

Figure 7:
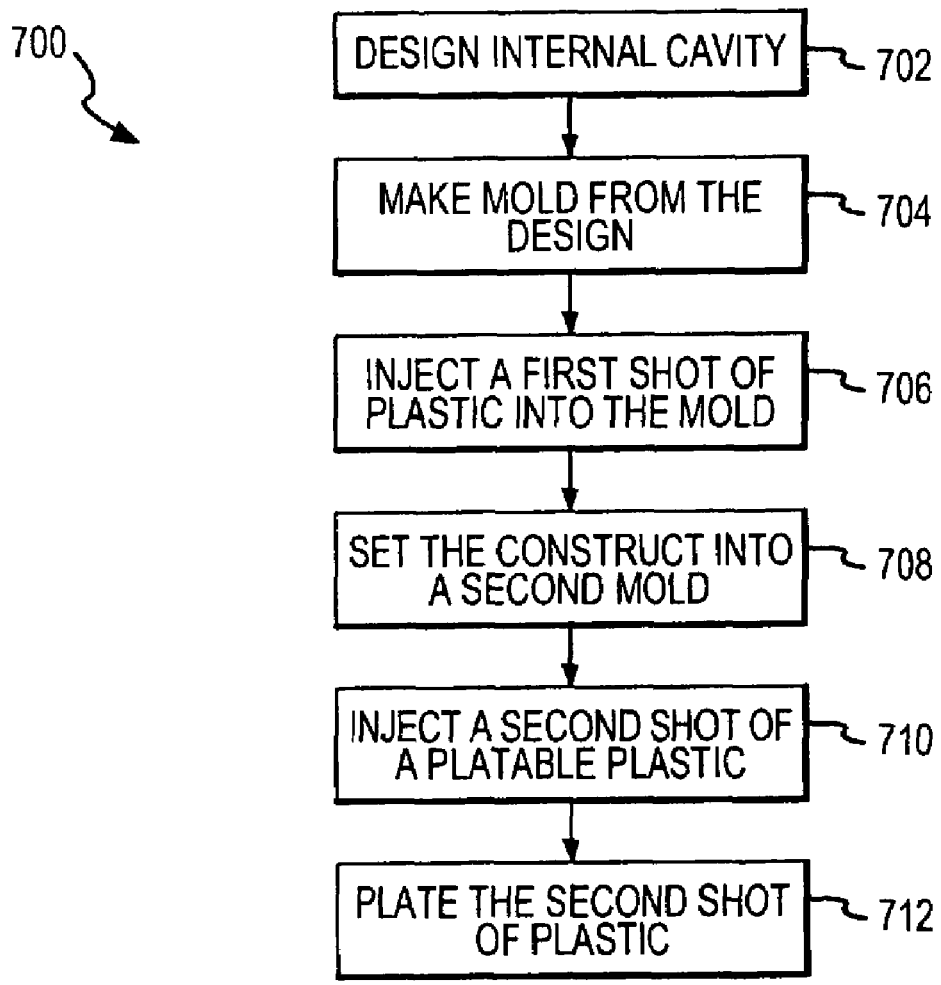
FIG. 7 is a flowchart consistent with a manufacturing process associated with one aspect of the present invention.

FIG. 7 shows a flowchart 700 illustrative of a method of manufacturing the wireless device in accordance with one aspect of the present invention. Flowchart 700 focuses on double shot molded selectively plated antenna 504a in a cellular phone, but one of ordinary skill in the art will now recognize that other parts and devices could similarly be manufactured using the present invention.

First, the wireless device is designed. In this example, the design uses the two shot molding process to reduce part count by incorporation as many components as possible into the handset design, step 702. An injection mold is then made to produce the handset design, step 704. Continuing with the cellular phone example, the internal space of the handset is designed to have an antenna section 604a. Thus, the handset is designed with the shape and placement of the entire antenna including, without limitation, contacts 504c and radiating element 504a. The handset is then molded using, in the two shot molded selectively plated process, a first shot of non-platable plastic, step 706 After the first shot of plastic, back panel 404 with internal space 502 is complete. Thus, while only the antenna section 604a was described, other parts, such as batteries, vibrators, circuitry, etc., would be molded in the internal space 502 of back panel 404.

Figure 1:
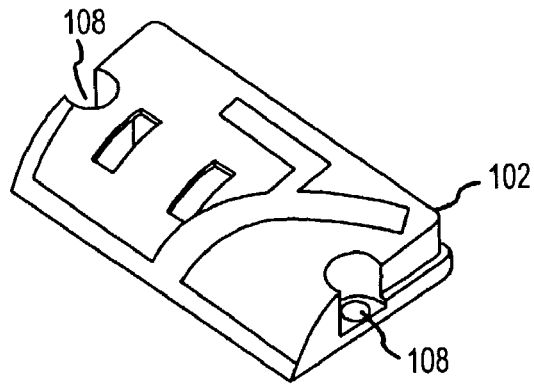
FIG. 1 is a perspective view of a base for a conventional antenna.
Figure 2:
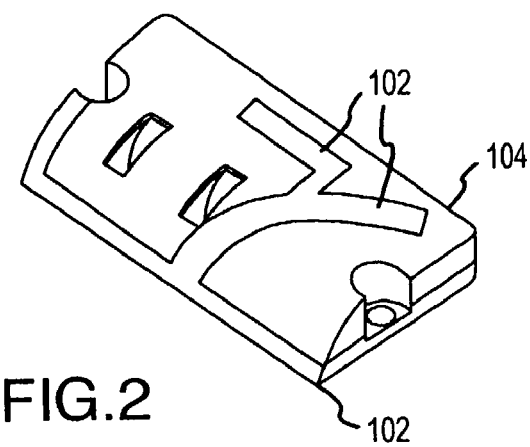
FIG. 2 is a perspective view of the base of FIG. 1 with a second layer of plastic.
Figure 3:
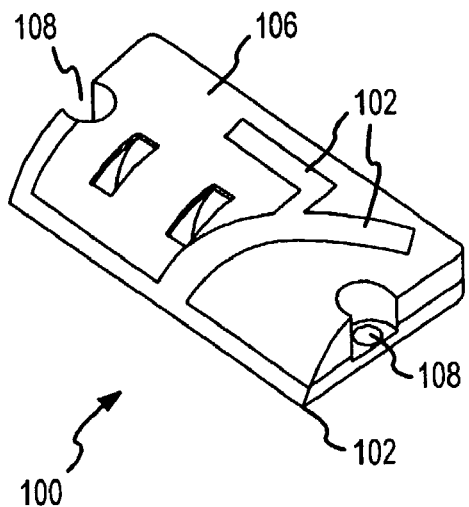
FIG. 3 is a perspective view of an antenna construct using the base plastic, second layer of plastic, and metalization.

After back panel 404 and internal space 502 are formed, it is placed into a second mold, step 708. Once in the mold, a second shot of platable plastic is injected into the mold, step 710. The section 604a now has two shots of plastic, which would correspond to the base 102 and platable plastic 104 of FIG. 1, but without mounting anchors 108, for example.

Notice, conventional devices would have a panel layer, a base layer, and a platable plastic layer; however, the present invention only has a panel layer and a platable plastic layer. Thus, the present invention eliminates the base layer and the mounting anchors.

After the antenna mold is completed, the platable plastic portion is plated with a metallic coating forming antenna 504, step 712. The plating forms both the radiating portion 504a and the contacts 504c. One of ordinary skill in the art would now recognize that other devices could be formed using the same process. While the above flowchart 700 relates specifically to a two shot molded selectively plated process, a manufacturer could use other processes as well, such a metal foil that is hot stamped or embossed in the handset, metal stamping that is insert molded into the assembly or the entire part is metalized and then certain portions of plating are removed by the laser etch process.

The selectively plated metal portions could be used as a common ground for the cellular phone, which would further reduce the parts and connections. The common ground could function as the ground for both the antenna and the battery, for example. Conversely, conventional methods using separate antenna and battery parts individually mounted frequently used separate grounds.

Figure 8:
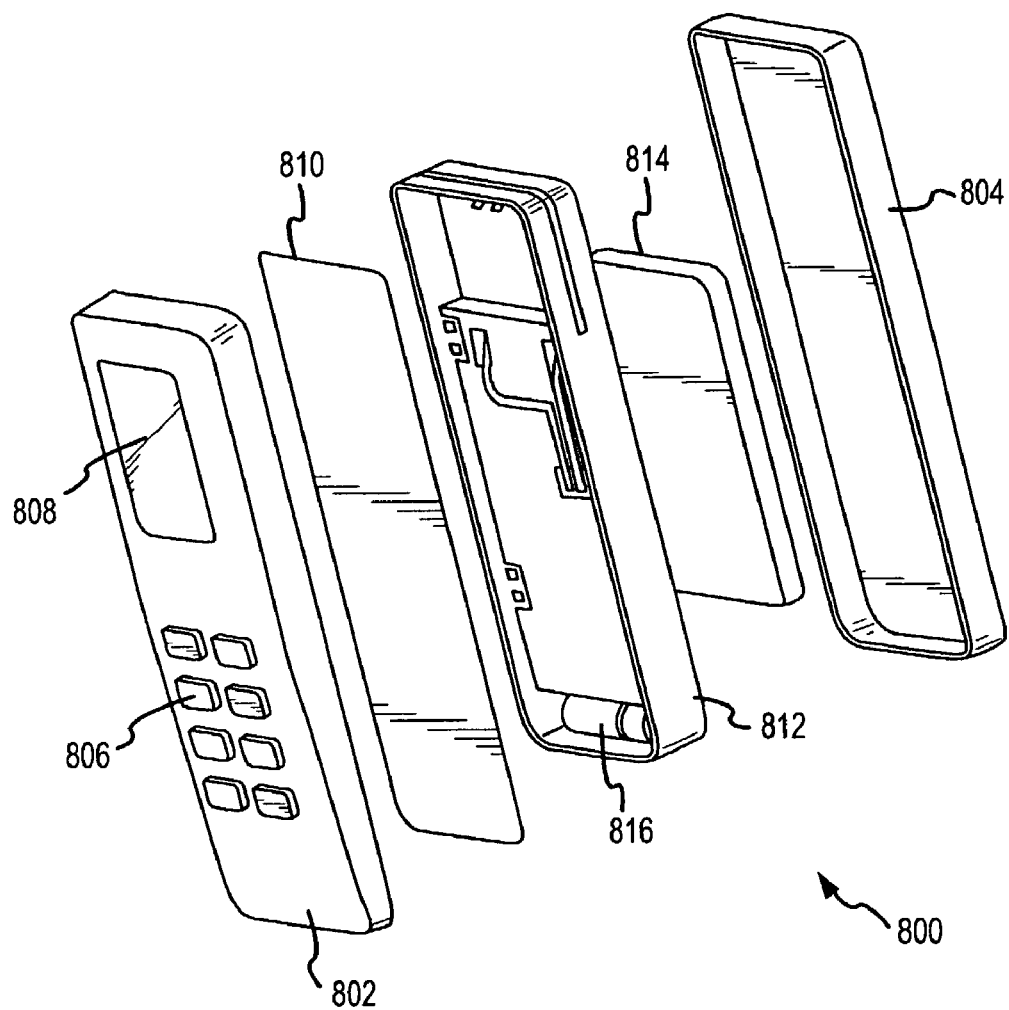
FIGS. 8 and 9 are perspective views of another wireless device consistent with the present invention.
Figure 9:
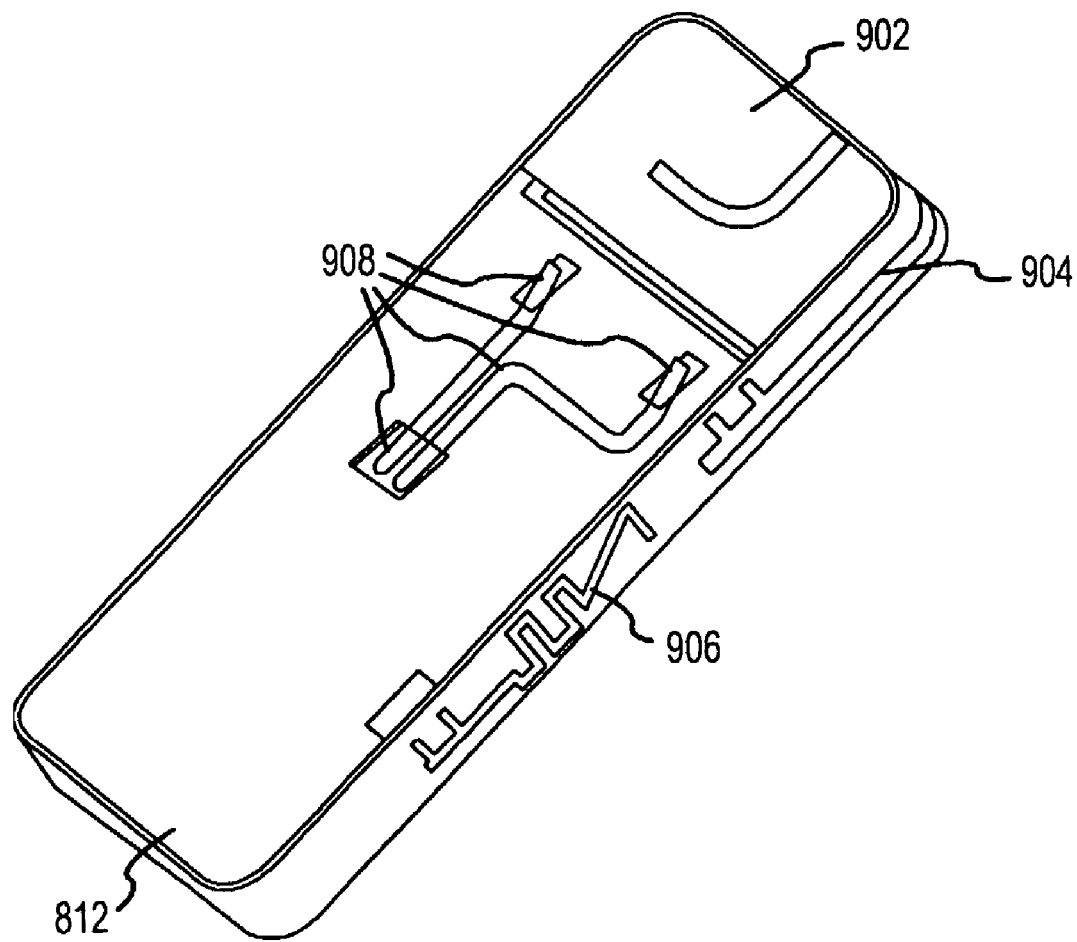
Figure 10:
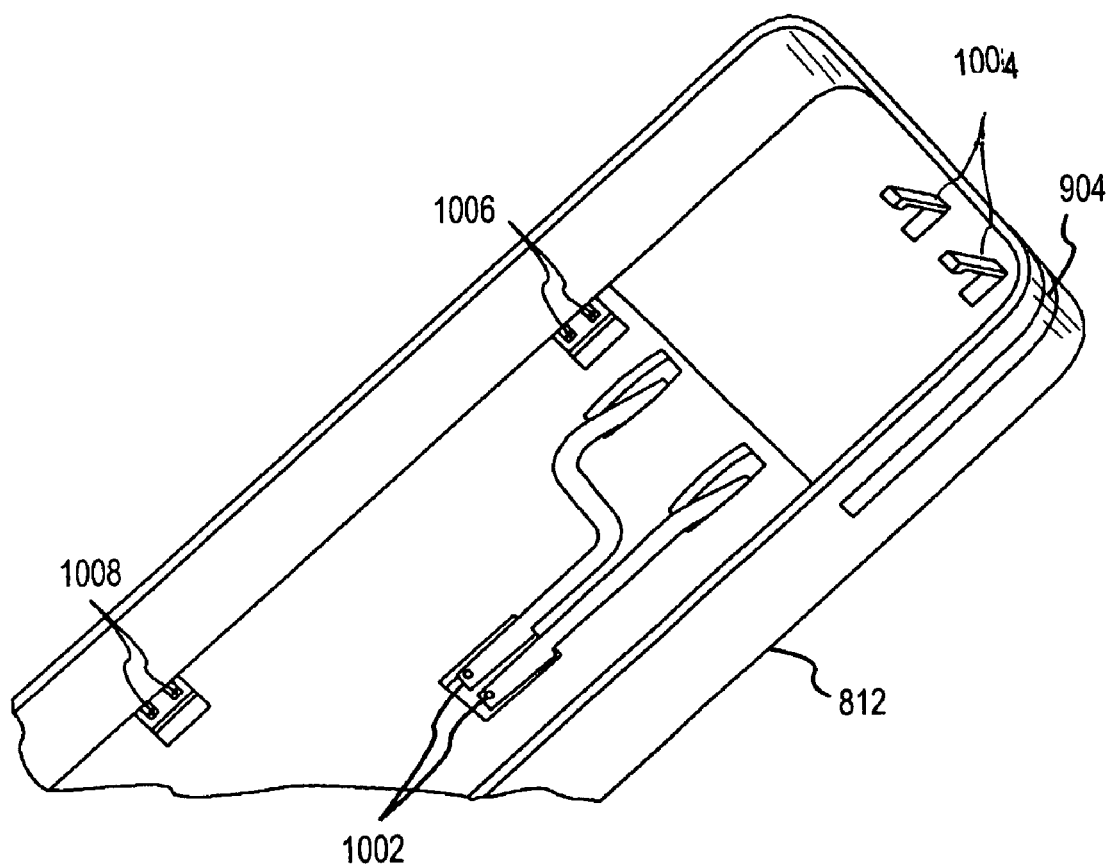
FIG. 10 is a perspective view of the back side of 8 and 9

While FIGS. 4–6 represent a particular style of wireless device, in particular a cellular phone with front panel 402 and back panel 404, other devices could be used, such as PDAs, laptops, electronic games, or other types of devices, such as cellular phone 800, shown in FIGS. 8–10.

The metallic plating can be accomplished using conventional methods, such as, for example, selectively plating portions of the internal surfaces using a two-shot molded, selectively plating technique, a metal stamp technique, embossing, or the like.

FIGS. 8 shows an exploded view of a cellular phone 800. Cellular phone 800 includes a front panel 802 and a back panel 804. Similar to cellular phone 400, cellular phone 800 includes at least one key 806 and at least one display 808. As can be seen in FIG. 8, cellular phone 800 an internal printed circuit board 810, a mid-section 812, and a battery pack 814 that reside between the front panel 802 and back panel 804. Mid-section 812 will be explained further in reference to FIG. 9 Printed circuit board 810 can be any conventional printed circuit board including connections, chips, and processors necessary for the cellular phone 800 to function. Battery pack 814 can be any conventional battery pack designed for use with cellular phone 800.

FIG. 9 shows a portion of mid-section 812 in more detail. Mid-section 812 includes a cellular antenna 902, a global positioning system (GPS) antenna 904 and a bluetooth antenna 906. Because mid-section 812 is internal to the front and back panels 802 and 804, beams 908 of mid-section 812 can be used hold portions of the antenna (or other metallic parts), such as the bluetooth antenna 906 or GPS antenna 904. Mid-section 812 also has contacts for the antenna (not specifically shown) and metallic beams 908 to provide conduits for power from the battery pack 814. While only one side of mid-section 812 is shown in FIGS. 8–10, one of ordinary skill in the art would recognize molded sections could be incorporated on a front and back side as well as side wall 908 of mid-section 812. Further, and also not specifically shown, printed circuit board 810 could be removed and the printed circuit could be molded/plated directly to mid-section 812 (or the front or back panel)

FIG. 10 shows contacts associated with mid-section 812. In particular, mid-section 812 has battery contact 1002, cellular antenna contacts 1004, GPS antenna contacts 1006, and bluetooth antenna contacts 1008. As can be seen, the battery contacts 1002 provide a connection between the battery pack on one side of mid-section 812 and the printed circuit board on the other. GPS antenna contacts are attached to the GPS antenna. Similarly, the bluetooth antenna contacts 1008 are connected to the bluetooth antenna (not shown in FIG. 10).

While the invention has been particularly shown and described with reference to a preferred embodiment thereof, it will be understood by those of ordinary skill in the art that various other changes in the form and details may be made without departing from the spirit and scope of the invention. Further, while particular configurations of the present invention have been illustrated and described, other configurations are possible.

We claim:

1. A housing for a wireless device comprising:
   a molded panel;
   an internal space;
   the internal space defined in part by the molded panel;
   at least one molded section in the internal space integrated in the molded panel, the at least one molded section connecting a separate electrical component directly to the wireless device;
   metal plating; and
   the metal plating attached to the at least one molded section providing electrical contacts integrated into the molded section to electrically connect a separate electrical component to the wireless device,
   wherein the separate electrical component is mechanically and electrically connected to the wireless device without additional connectors.

2. The housing of claim 1, wherein the separate electrical component is an antenna.

3. The housing of claim 2, wherein the antenna comprises at least one of a cellular telephone antenna, a GPS antenna, and a bluetooth antenna.

4. The housing of claim 2, wherein the antenna comprises at least one of a planer inverted F antenna, a IFA, a dipole, a monopole, a j pole, or a meanderline.

5. The housing of claim 1, wherein the molded panel comprises:
   a front panel; and
   a back panel, wherein
   the front panel and the back panel are coupled together to form the internal space.

6. The housing of claim 5, wherein the at least one molded section resides within the internal space.

7. The housing of claim 5, wherein the metal plating forms a ring circuit for a cellular telephone.

8. The housing of claim 1, wherein the separate electrical component comprises at least one of an antenna, a battery, a battery charger circuit, a ring circuit, a vibrator circuit, a keyboard circuit, and a printed circuit board.

9. The housing of claim 1, wherein the wireless device comprises at least one of a cellular telephone, an electronic game, a personal digital assistant, a wireless enabled computer, a handheld radio, a portable television, and a portable DVD player.

10. The housing of claim 1, wherein the at least one molded section comprises:
    a base plastic section; and
    a platable plastic, wherein
    the base plastic section comprises a portion of the back panel and the platable plastic is selectively molded to the base plastic section such that the metal plating exists only where the platable plastic exists, wherein the metal plating forms an antenna for and connects the antenna electrically to the wireless device.

11. The housing of claim 1, wherein the metal plating comprises a metal foil attached to the at least one molded section.

12. A housing for a wireless device comprising:
    at least one front panel;
    at least one back panel;
    the at least one front panel coupled to the at least one back panel forming at least one internal space;
    at least one mid panel;
    the at least one mid panel existing between the at least one front panel and the at least one back panel and residing in the at least one internal space;
    the at least one mid panel comprising at least one molded section internal to a space defined by the at least one front panel and at least one back panel, the at least one molded section connecting a separate electrical component directly to the wireless device;
    metal plating; and
    the metal plating attached to the at least one molded section providing electrical contacts integrated into the molded section to electrically connect a separate electrical component to the wireless device,
    wherein the separate electrical component is mechanically and electrically connected to the wireless device without additional connectors.

13. The housing of claim 12, wherein the separate electrical component comprises an antenna integral to the molded panel.

14. The housing of claim 13, wherein the antenna comprises at least one of a planer inverted F antenna, a IFA, a dipole, a monopole, a j pole, or a meanderline.

15. The housing of claim 12, wherein
    the at least mid panel comprises at least one side wall; and
    the at least one molded section resides on the at least one side wall.

16. The housing of claim 12, wherein the separate electrical component comprises at least one of an antenna, a battery, a battery charger, a ring circuit, a vibrator circuit, a keyboard circuit, and a printed circuit board.

17. The housing of claim 16, wherein the antenna comprises at least one of a cellular telephone antenna, a GPS antenna, and a bluetooth antenna.

18. The housing of claim 12, wherein the wireless device comprises at least one of a cellular telephone, an electronic game, a personal digital assistant, a wireless enabled computer, a handheld radio, a portable television, and a portable DVD player.

19. The housing of claim 12, wherein the at least one molded section comprises:
a base plastic section; and
a platable plastic, wherein
the base plastic section comprises at least a portion of the mid panel and the platable plastic is selectively molded to the base plastic section such that the metal plating exists only where the platable plastic exists, wherein the metal plating forms an antenna for and connects the antenna electrically to the wireless device.

20. The housing of claim 12, wherein the at least one molded section resides within the internal space.

21. The housing of claim 12, wherein the metal plating comprises metal foil.

22. A method of making a housing for a wireless device having components integrally molded thereto, the method comprising the steps of:
designing a housing for a wireless device having at least one molded section internal to a space defined by the housing;
forming the housing such that the at least one internal molded section is integral to the housing and shaped to hold a separate electrical component; and
plating the at least one internal molded section of the housing, wherein
the separate electrical component is mechanically and electrically connected to the wireless device without additional connectors.

23. The method of claim 22, wherein the forming step comprises:
injecting a first non-platable plastic into a mold; and
injecting a second platable plastic into a mold such that the housing is formed.

24. The method of claim 23, wherein the plating step comprises:
using an electrolytic process to plate the platable plastic.

25. The method of claim 23, wherein the plating step comprises:
using an electroless process to plate the platable plastic.

26. The method of claim 22, wherein the plating step comprises:
placing a metal foil on the at least one internal molded section; and
hot stamping the metal foil to the at least one internal molded section.

27. The method of claim 22, wherein the plating step comprises:
placing a metal foil on the at least one internal molded section; and
embossing the metal foil to the at least one internal molded section.

* * * * *